United States Patent
Roberson et al.

[11] Patent Number: 5,897,415
[45] Date of Patent: Apr. 27, 1999

[54] CATHODE STRUCTURE FOR A PLASMA ADDRESSED LIQUID CRYSTAL DISPLAY PANEL

[75] Inventors: Mark W. Roberson, Cary, N.C.;
Robert D. Hinchliffe, Newberg, Oreg.;
Kevin J. Ilcisin, Beaverton, Oreg.;
John S. Moore, Beaverton, Oreg.

[73] Assignee: Tektronix, Inc., Wilsonville, Oreg.

[21] Appl. No.: 08/893,409

[22] Filed: Jul. 11, 1997

Related U.S. Application Data

[60] Provisional application No. 60/021,625, Jul. 12, 1996.

[51] Int. Cl.[6] ................. H01J 9/02; H01J 19/24
[52] U.S. Cl. ................................. 445/50; 445/58
[58] Field of Search ................. 445/24, 50, 58; 313/586, 584

[56] References Cited

U.S. PATENT DOCUMENTS

| 4,494,037 | 1/1985 | De Vries | 313/584 |
| 5,707,267 | 1/1998 | Hayashi | 445/24 |
| 5,772,486 | 6/1998 | Seki | 445/24 |

FOREIGN PATENT DOCUMENTS

| 58-209847 | 12/1983 | Japan . |
| 4-095332 | 3/1992 | Japan . |
| 5-094760 | 4/1993 | Japan . |
| 2 079 046 | 1/1982 | United Kingdom . |
| 96 19789 | 6/1996 | WIPO . |

*Primary Examiner*—Kenneth J. Ramsey
*Attorney, Agent, or Firm*—John D. Winkelman; John Smith-Hill

[57] ABSTRACT

A composite electrode in a channel substrate for a PALC display panel comprises a core that includes a metal and a surface layer of a resistive anodic oxide of the core metal.

6 Claims, 2 Drawing Sheets

CATHODE STRUCTURE FOR A PLASMA ADDRESSED LIQUID CRYSTAL DISPLAY PANEL

CROSS REFERENCED TO RELATED APPLICATIONS

This application claims the benefit of U.S. Provisional Application No. 60/021,625, filed Jul. 12, 1996.

BACKGROUND OF THE INVENTION

This invention relates to a cathode structure for a plasma addressed liquid crystal display panel.

U.S. Pat. No. 5,077,553 discloses apparatus for addressing data storage elements. A practical implementation of the apparatus shown in U.S. Pat. No. 5,077,553 is illustrated schematically in FIG. 2 of the accompanying drawings.

The display panel shown in FIG. 5 comprises, in sequence from below, a polarizer 2, a channel substrate 4, a cover sheet 6 (commonly known as a microsheet), a layer 10 of electro-optic material, an array of parallel transparent data drive electrodes (only one of which, designated 12, can be seen in the view shown in FIG. 2), an upper substrate 14 carrying the data drive electrodes, and an upper polarizer 16. The channel substrate 2 is typically made of glass and is formed with multiple parallel channels 20 in its upper main face. The channels 20, which are separated by ribs 22, are filled with an ionizable gas, such as helium. An anode 24 and a cathode 26 are provided in each of the channels 20. The channels 20 are orthogonal to the data drive electrodes and the region where a data drive electrode crosses a channel (when viewed perpendicularly to the panel) forms a discrete panel element 28. Each panel element can be considered to include elements of the layer 10 and the upper and lower polarizers 2 and 16. In the case of a color display panel, the panel elements include color filters (not shown) between the layer 10 and the upper substrate 14. The region of the upper surface of the display panel that bounds the panel element constitutes a single pixel 30 of the display panel.

The anodes in the several channels are held at ground potential. When a suitable negative voltage is applied to the cathode in one of the channels, the gas in that channel forms a plasma that provides a conductive path at the lower surface of the cover sheet 6. If the data drive electrode is at ground potential, there is no significant electric field in the volume element of electro-optic material and the panel element is considered to be off, whereas if the data drive electrode is at a substantially different potential from ground, there is a substantial electric field in that volume element of electro-optic material and the panel element is considered to be on.

It is conventional to assemble a display panel of the kind shown in FIG. 5 by forming a channel substrate assembly, including the channel substrate and the cover sheet, forming an upper substrate assembly, including the upper substrate, the data drive electrodes, and the layer of electro-optic material, and attaching the upper substrate assembly to the channel substrate assembly. In manufacture of the channel substrate assembly, the cover sheet is placed over the upper surface of the channel substrate and is frit sealed to the channel substrate around the periphery thereof.

It is known to fabricate the cathodes in a PALC display panel using a nickel or chromium base layer having a coating of a finely divided rare earth hexaboride, such as $LaB_6$, dispersed in a glass matrix. The rare earth hexaboride is used as the coating material on the nickel or chromium base layer because it has a low work function so that it is an efficient emitter of electrons, and has a moderate heat of sublimation so that it is sputter resistant. However, there are some features of this cathode structure that might be considered less than optimal in some applications. For example, it is desirable that the coating material should have a fairly high resistivity so that an electric field that will force electrons to the surface of the cathode for emission into the plasma can be established in the coating material, but the conductivity of a rare earth hexaboride is rather high and consequently the field may be considered smaller than optimum. Further, when the cathode is formed, it may have asperities (convex regions in which the radius of curvature of the surface is or approaches zero, such as points, ridges or edges of the cathode), such that the electric field is non-uniform over the cathode and consequently the current density is non-uniform, leading to high temperatures and the possibility of arcing between the cathode and anode in a given channel.

In a helium-neon (HeNe) laser, the cathode is typically a tube of aluminum. In a HeNe laser that operates in the normal glow condition, there is a tendency for sputtering to take place at the cathode. It has been found that the problem of sputtering at the cathode of a HeNe laser can be ameliorated by anodically oxidizing the aluminum cathode.

A layer of aluminum oxide can be formed on a body of aluminum either thermally, by heating in an oxidizing atmosphere, or anodically, by establishing an oxidizing plasma between the aluminum body connected as anode and a cathode. Thermal aluminum oxide is a good insulator. When thermal oxide is formed on a body of aluminum, the thickness of the oxide layer is generally uniform and does not depend on the topography of the surface. When an anodic oxide layer is formed on a body of aluminum, the thickness of the layer depends on the topography of the surface, because the rate at which the anodic oxide is formed depends on the current density and the current density depends on the topography. The anodic oxide is formed preferentially at asperities of the aluminum body.

SUMMARY OF THE INVENTION

In accordance with a first aspect of the invention, there is provided a method of forming an electrode on a channel substrate for a PALC display panel, said channel substrate having a plurality of channels in an upper surface thereof, comprising forming at least one conductive strip in a channel of the channel substrate, the conductive strip comprising a metal that can be anodically oxidized to form a resistive metal oxide, and anodically oxidizing a surface layer of the conductive strip, whereby an electrode comprising a metal core and a surface layer of said resistive metal oxide is formed.

In accordance with a second aspect of the invention, there is provided a method of forming an electrode on a channel substrate for a PALC display panel, said channel substrate having a plurality of channels in an upper surface thereof, comprising forming at least one conductive strip in at least one channel of the channel substrate, the conductive strip comprising a metal that can be anodically oxidized to form a resistive metal oxide, and establishing an oxidizing plasma between the conductive strip connected as anode and a cathode, whereby the metal of the conductive strip is partially anodically oxidized and an electrode comprising a core including said metal and a surface layer of said resistive metal oxide is formed.

In accordance with a third aspect of the invention, there is provided a method of forming an electrode on a channel substrate for a plasma addressed liquid crystal display panel, comprising depositing an electrode metal in accordance with a predetermined pattern, the electrode metal being a metal that forms a resistive anodic oxide, and anodically oxidizing the electrode metal to form a resistive coating on a conductive core.

In accordance with a fourth aspect of the invention, there is provided a channel substrate for a PALC display panel, said channel substrate having a plurality of channels in an upper surface thereof and having at least one electrode in one of said channels, wherein said one electrode has a composite structure and comprises a core that includes a metal and a surface layer of a resistive anodic oxide of said metal.

BRIEF DESCRIPTION OF THE DRAWINGS

For a better understanding of the invention, and to show how the same may be carried into effect, reference will now be made, by way of example, to the accompanying drawings, in which.

In the several figures of the drawings, like reference numerals are used to denote corresponding elements.

Words of orientation and position, such as upper and lower, are used in the specification to establish orientation relative to the drawings are not intended to be limiting in a absolute sense.

DETAILED DESCRIPTION

Figure 1:
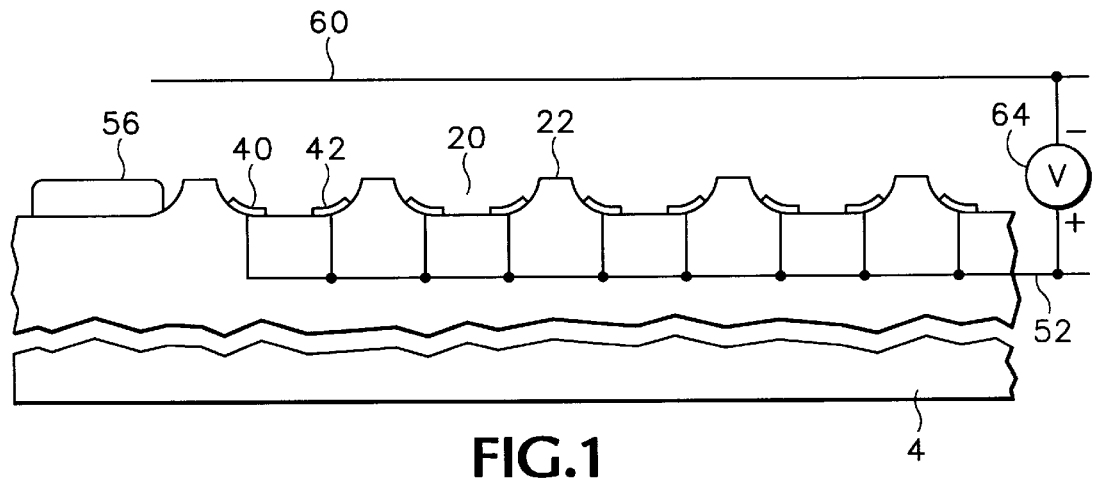
FIG. 1 is a partial sectional view of the channel substrate of a plasma addressed liquid crystal display panel in a plasma discharge cell.
Figure 2:
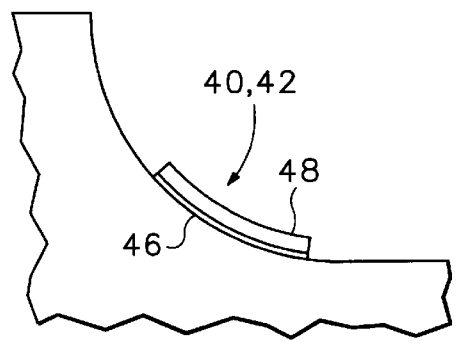
FIG. 2 is an enlarged view of a detail of FIG. 1, illustrating the structure of one of the electrodes in the channel substrate.
Figure 3A:
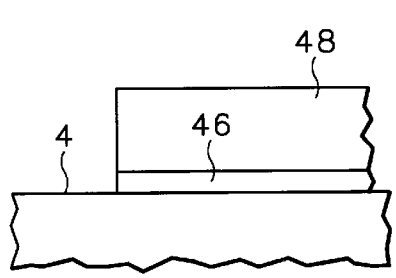
FIG. 3A is a further enlarged view showing the electrode in a simplified sectional illustration prior to processing in the plasma discharge cell.
Figure 4:
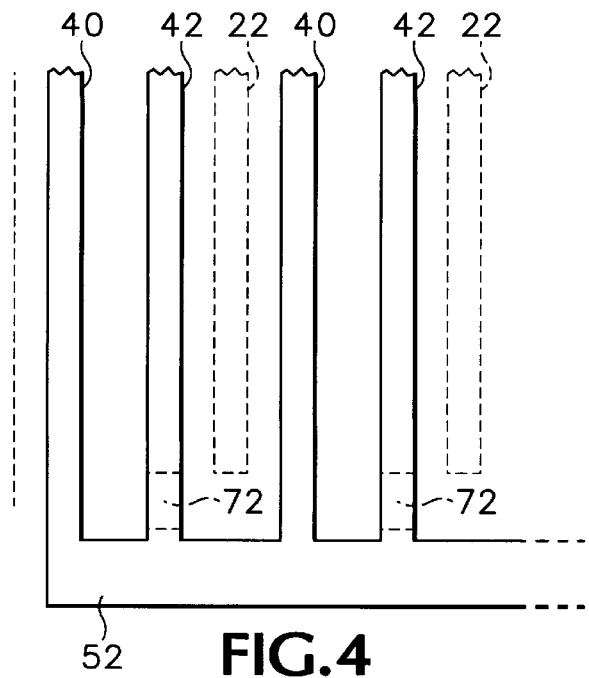
FIG. 4 is a schematic plan view of the channel substrate shown in FIG. 1.
Figure 5:
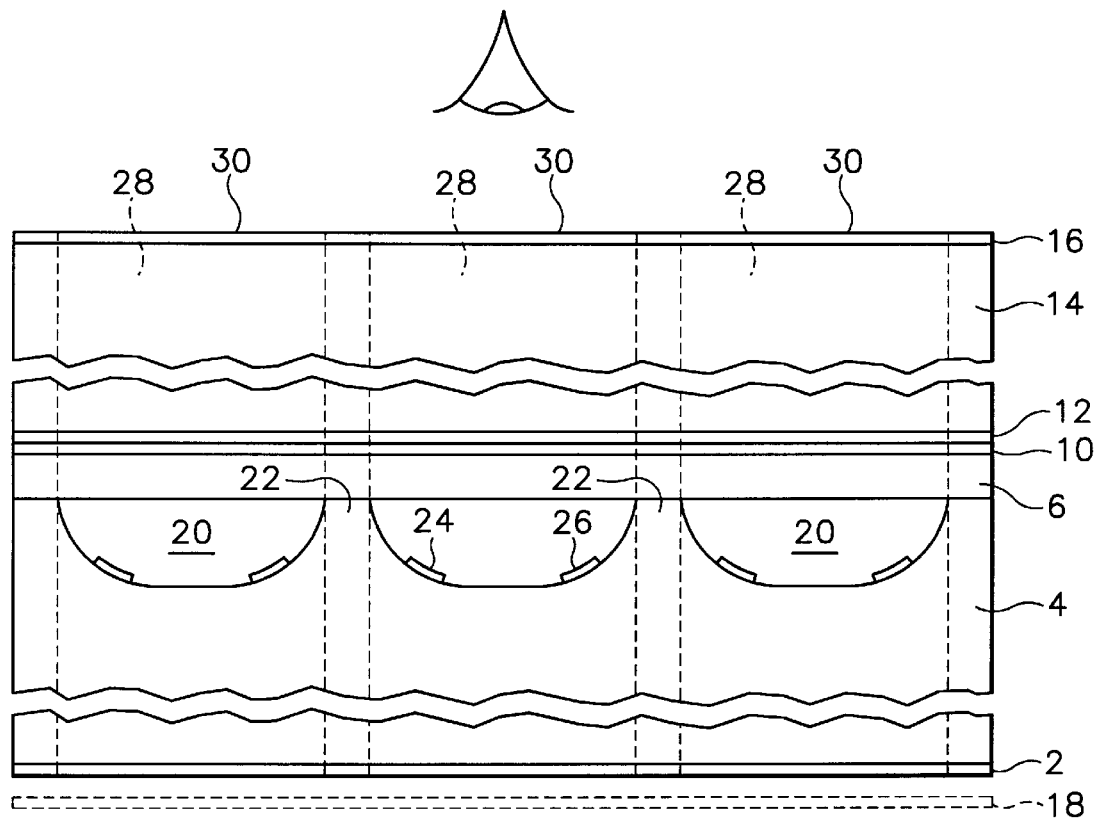
FIG. 5 illustrates schematically a sectional view of a PALC display panel in accordance with the prior art.

The channel substrate shown in FIG. 1 has two metal strips 40 and 42 in each of the channels. Referring to FIG. 2 and FIG. 3A, each metal strip is composed of a thin base layer 46 of chromium, which adheres well to the glass substrate, and a cover layer 48 of aluminum. The metal strips may be formed by depositing a blanket layer of chromium over the entire upper surface of the channel substrate, depositing a blanket layer of aluminum over the entire layer of chromium, and etching back the aluminum and chromium layers using known photolithographic techniques to form the desired pattern of metal strips. As shown in FIGS. 1 and 4, all the metal strips 40 and 42 are electrically connected together by a rail 52, which extends along an edge of the channel substrate, and thus form a single electrically continuous electrode.

A strip 56 of glass frit in an organic binder is placed around the periphery of the channel substrate and the channel substrate is then baked in at atmosphere containing oxygen in order to remove the organic binders. The baking operating results in formation of a layer of thermal aluminum oxide over the metal strips. The thermal oxide is removed by back sputtering with argon at a pressure of $5 \times 10^{-3}$ mbar and a voltage of 500 volts. Referring again to FIG. 1, the channel substrate 4 is then placed in a plasma discharge vessel beneath a plate form electrode 60. The vessel contains an atmosphere of air at a pressure of approximately 200 mBar. The rail 52 is connected to the positive terminal of a DC power supply 64 and the plate form electrode 60 is connected to the negative terminal of the DC power supply, and a plasma is created between the strips 40 and 42 as anode and the plate 60 as cathode. The aluminum cover layer 48 is partially anodically oxidized, with the result that the aluminum cover layer 48 is converted to a somewhat thinner layer 48' of aluminum covered by a layer 68 of an anodic oxide of aluminum.

After the layer 68 of anodic oxide has been formed, the metal strip 42 of each pair is separated from the other strip of the pair, e.g. by etching away the portions 72, while the strips 40 remain connected to the rail 52.

The cover sheet is then placed over the channel substrate and the channel substrate assembly is heated in order to frit seal the cover sheet to the channel substrate. Heating takes place in an inert atmosphere in order to prevent formation of thermal aluminum oxide on the strips 40 and 42, or conversion of the anodic oxide to a thermal oxide. The channel substrate assembly is attached to the upper substrate assembly in conventional fashion. In operation of the completed PALC display panel, the strips 40 are connected to ground through the rail 52 and thus serve as anodes and the strips 42 are connected to respective drivers for applying the proper negative voltages and thus serve as cathodes.

Figure 3B:
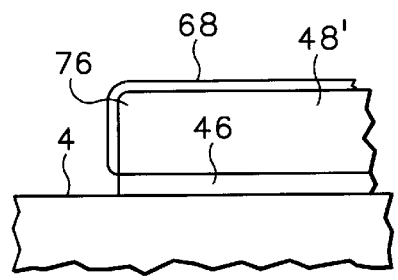
FIG. 3B is a view similar to FIG. 3A showing the electrode after processing in the plasma discharge cell.

The cathode structure that is produced by the method described above has significant advantages over the conventional cathode structure that has hitherto been used in a PALC display panel. In particular, the anodic oxide has a higher heat of sublimation than the rare earth hexaborides that have previously been used, and therefore is more resistant to sputtering damage. Further, the anodic oxide has higher resistivity than the rare earth hexaborides that have previously been used, and consequently, the anodic oxide layer supports an electric field that impels electrons toward the surface of the electrode for emission. Since the anodic oxide builds up preferentially at asperities, as shown at the corner 76 in FIG. 3B, it reduces the maximum electric field, thereby reducing non-uniformities in current density and the risk of arcing and hot spots, which could increase sputtering damage.

It will be appreciated that the invention is not restricted to the particular embodiment that has been described, and that variations may be made therein without departing from the scope of the invention as defined in the appended claims and equivalents thereof. For example, the invention is not restricted to the case in which the aluminum is provided as a continuous layer over the chromium base layer, since it may be provided in the form of aluminum particles embedded in an insulating matrix. Even so, the aluminum particles that are exposed at the surface of the layer receive a coating of anodic aluminum oxide. Further, the invention is not restricted to the use of aluminum as the metal to form the anodic oxide layer, since other metals, such as magnesium, may form suitable anodic oxides. Moreover, although for the sake of convenience in processing the anodic oxide layer may be formed on both the cathode and the anode in each channel, the invention is not restricted to the anodic oxide layer being formed on both electrodes, since the advantages of the anodic oxide layer are obtained principally at the cathode.

We claim:

1. A method of forming an electrode on a channel substrate for a PALC display panel, said channel substrate having a plurality of channels in an upper surface thereof, comprising:

forming at least one conductive strip in a channel of the channel substrate, the conductive strip comprising a metal that can be anodically oxidized to form a resistive metal oxide, and anodically oxidizing a surface layer of the conductive strip, whereby an electrode comprising a metal core and a surface layer of said resistive metal oxide is formed.

2. A method of forming an electrode on a channel substrate for a PALC display panel, said channel substrate having a plurality of channels in an upper surface thereof, comprising:

forming at least one conductive strip in at least one channel of the channel substrate, the conductive strip comprising a metal that can be anodically oxidized to form a resistive metal oxide, and establishing an oxidizing plasma between the conductive strip connected as anode and a cathode, whereby the metal of the conductive strip is partially anodically oxidized and an electrode comprising a core including said metal and a surface layer of said resistive metal oxide is formed.

3. A method according to claim 2, wherein said conductive strip comprises particles of said metal in a matrix of insulating material.

4. A method according to claim 2, comprising forming said conductive strip by depositing particles of said metal in an insulating binding material in said one channel.

5. A method according to claim 2, comprising forming said conductive strip by depositing a continuous layer of said metal.

6. A method of forming an electrode on a channel substrate for a plasma addressed liquid crystal display panel, comprising:

depositing an electrode metal in accordance with a predetermined pattern, the electrode metal being a metal that forms a resistive anodic oxide, and anodically oxidizing the electrode metal to form a resistive coating on a conductive core.

\* \* \* \* \*